May 18, 1954 W. H. JENNINGS 2,678,613
APPARATUS FOR FORMING PARKER HOUSE ROLLS
Filed May 1, 1952 3 Sheets-Sheet 1
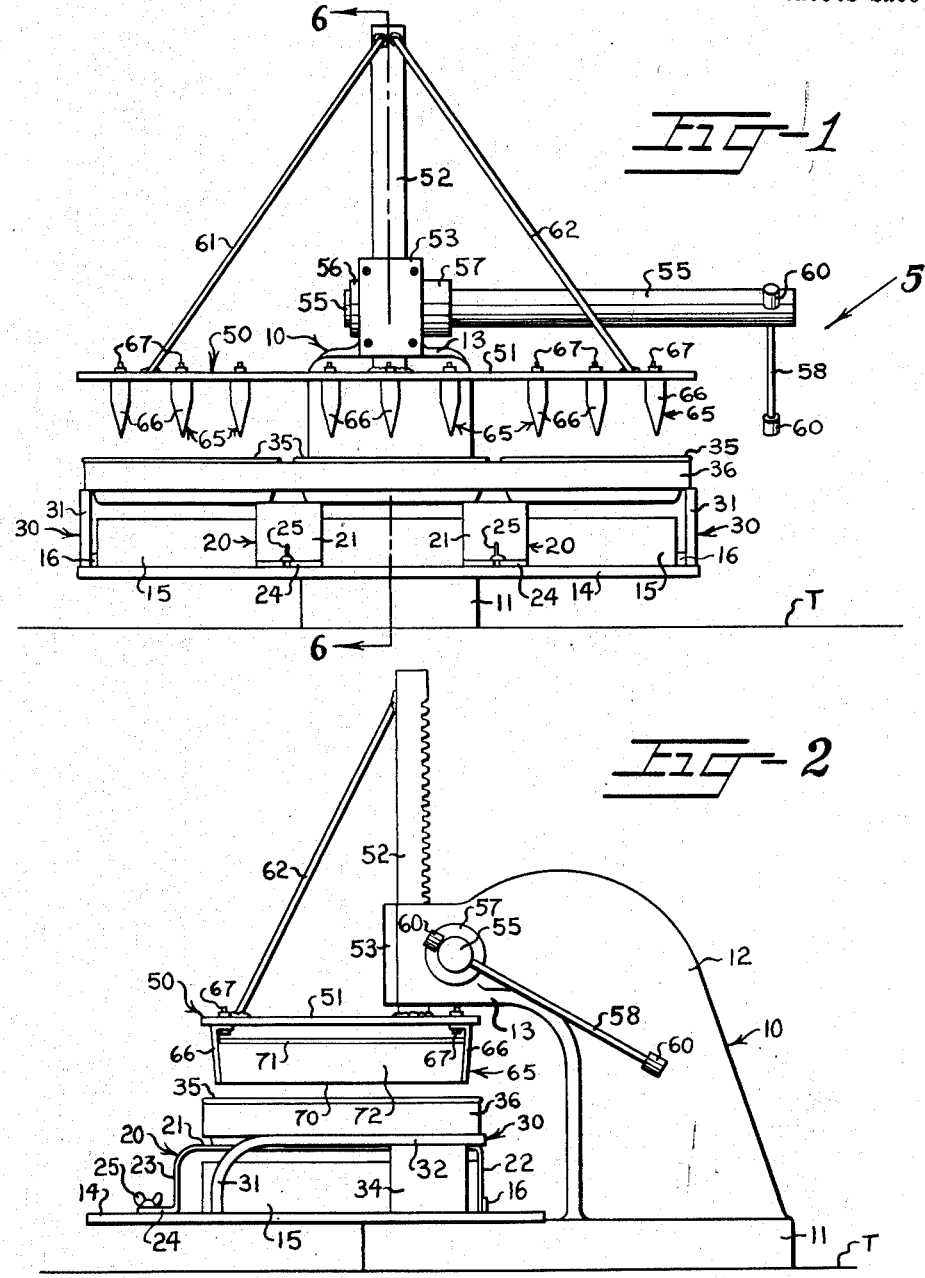
INVENTOR:
WILLIAM H. JENNINGS.
BY Eaton + Bell
ATTORNEYS May 18, 1954
W. H. JENNINGS
2,678,613
APPARATUS FOR FORMING PARKER HOUSE ROLLS
Filed May 1, 1952
3 Sheets-Sheet 2
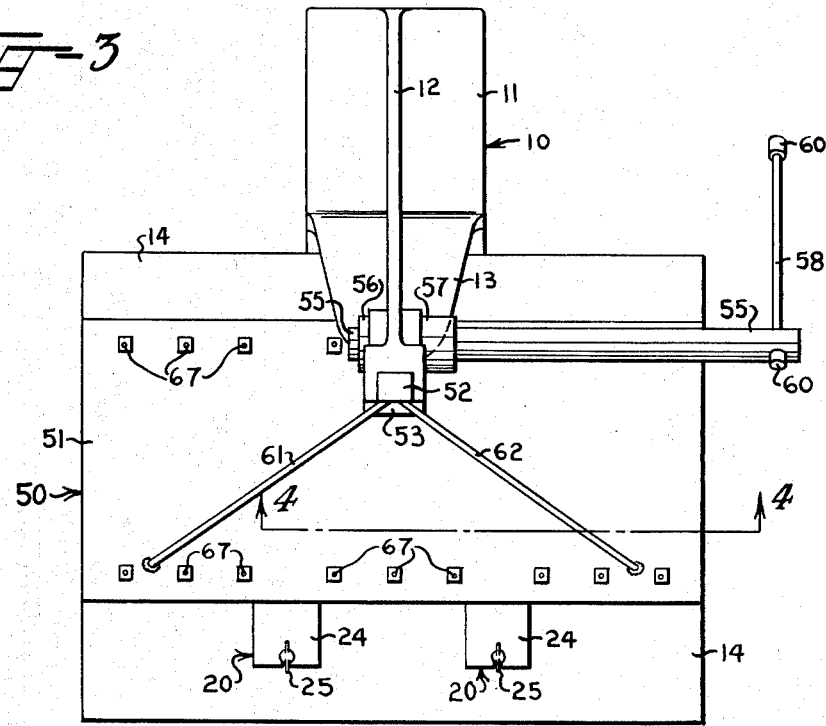
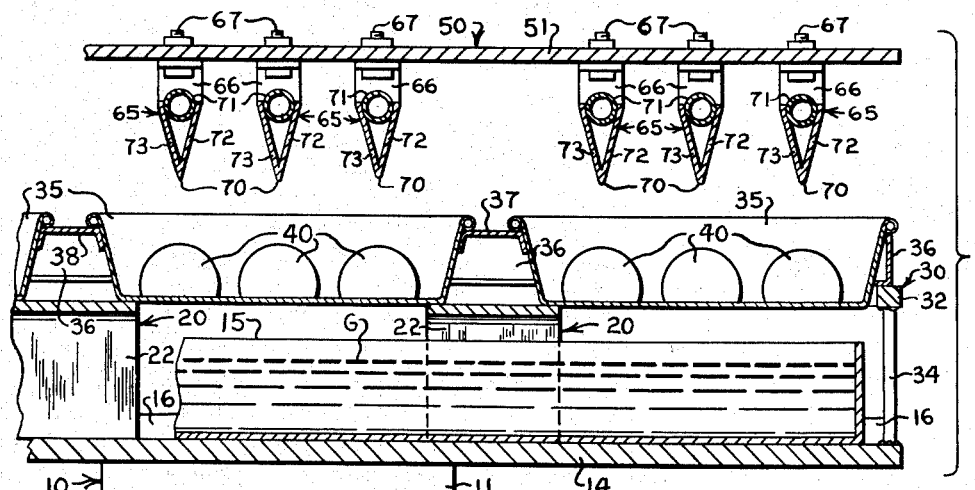
WILLIAM H. JENNINGS,
INVENTOR.
BY Eaton & Bell
ATTORNEYS.

May 18, 1954   W. H. JENNINGS   2,678,613
APPARATUS FOR FORMING PARKER HOUSE ROLLS
Filed May 1, 1952   3 Sheets-Sheet 3
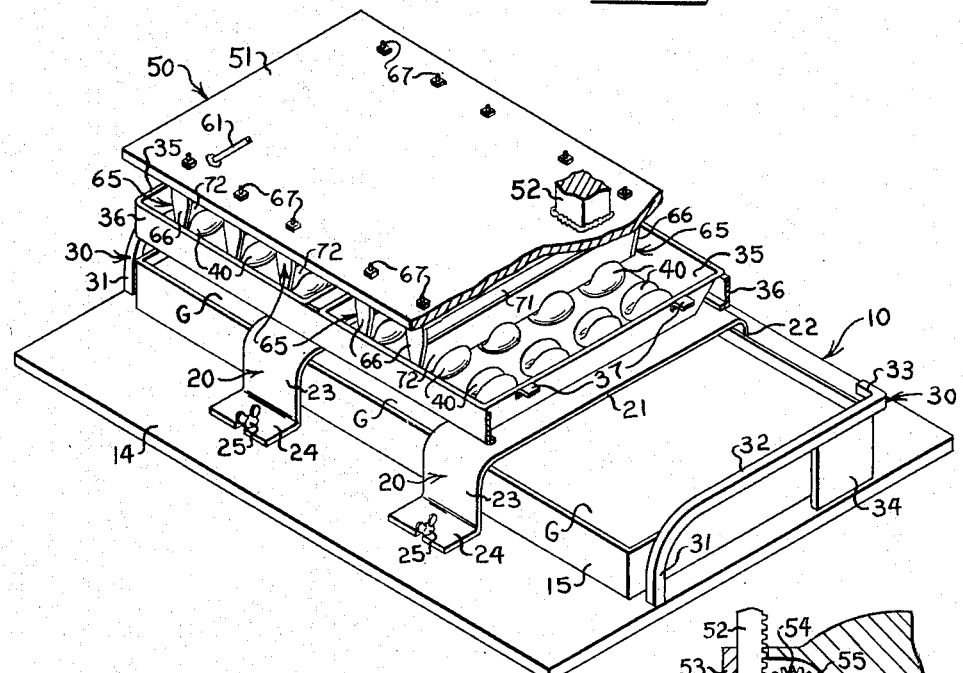
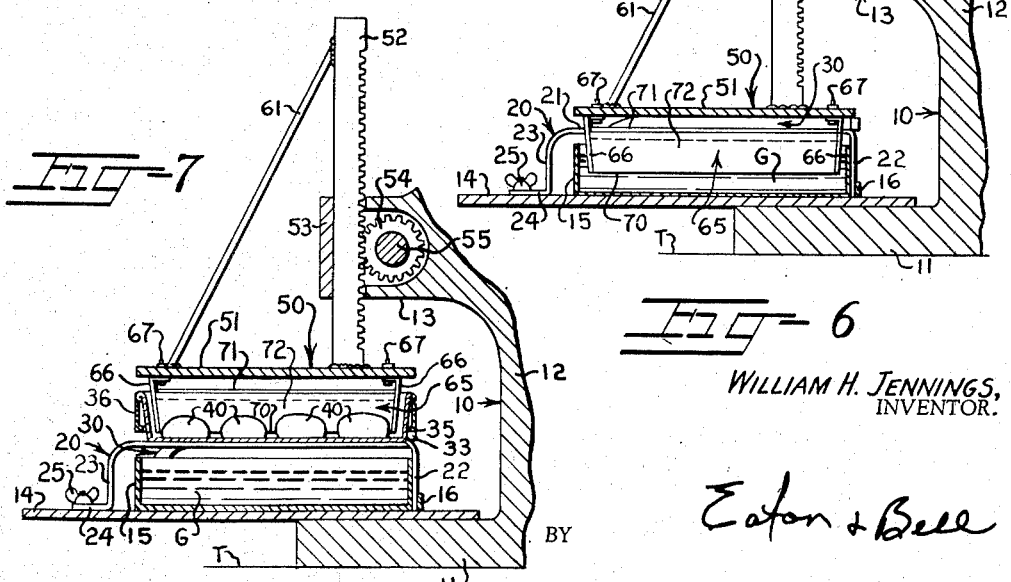
WILLIAM H. JENNINGS,
INVENTOR.
BY Eaton & Bell
ATTORNEYS Patented May 18, 1954

2,678,613

UNITED STATES PATENT OFFICE 2,678,613

APPARATUS FOR FORMING PARKER HOUSE ROLLS

William H. Jennings, Charlotte, N. C.

Application May 1, 1952, Serial No. 285,367

2 Claims. (Cl. 107—8)

This invention relates to apparatus for forming pastry and more especially to an apparatus for crimping or creasing individual portions of dough for forming rolls of the Parker House type.

In the commercial manufacture of rolls, it is customary to form a plurality of individual portions or balls of dough either manually or by a machine and these individual portions or balls of dough are then placed on a pan for baking purposes. Heretofore, the individual portions of dough thus formed would make rolls of the substantially even, square or round type, or somewhat similar to biscuits. Now, in order to make rolls of the Parker House type, it has been necessary to flatten the individual portions or balls of dough and then to fold each flattened portion partially upon itself. This has usually been a manual operation which is time consuming and costly.

It is an object of this invention to provide apparatus for placing a crimp in previously formed balls of dough so that when baked, these portions or balls of dough will have the appearance of Parker House rolls. To this end, there is provided a platform or base adapted to receive one or more pans containing a plurality of individual portions or balls of dough therein and means are provided spaced above the platform for carrying a plurality of dividing, creasing or crimping knives. A handle and rack and pinion arrangement is utilized for moving the crimping means into engagement with the portions of dough so that the crimping means will crimp the dough portions but will not divide the same entirely.

It is another object of this invention to provide a device having a base portion for holding at least one pan of individual portions of dough and movable crimping means for engaging said portions of dough for crimping the same in which there is provided a pan of hot grease disposed beneath the pan of rolls and the crimping elements whereby, upon the pan of rolls having been removed, the crimping elements may be positioned with their cutting portions in said grease to prevent the same from sticking to subsequent portions of dough crimped thereby.

Some of the objects of the invention having been stated, other objects will appear as the description proceeds when taken in connection with the accompanying drawings, in which—

Figure 1 is a front elevation of the roll forming apparatus showing the crimping elements in raised position;

Figure 2 is a side elevation of the apparatus looking at the right-hand side of Figure 1;

Figure 3 is a top plan view of the roll forming apparatus;

Figure 4 is an enlarged fragmentary vertical sectional view taken substantially along the line 4—4 in Figure 3 and showing the preferred construction of the dividing elements and the support for the roll pans;

Figure 5 is a partial isometric view of the lower portion of the apparatus looking in the general direction of the arrow 5 in Figure 1 with parts in section and parts broken away, and showing the crimping elements in engagement with the portions of dough in the roll pans;

Figure 6 is a vertical sectional view of the lower portion of the apparatus taken substantially along the line 6—6 in Figure 1, but showing the crimping elements partially disposed within the grease pan;

Figure 7 is a vertical sectional view similar to Figure 6 but showing the crimping elements in the position assumed when crimping portions of dough.

Referring more specifically to the drawings, the numeral 10 broadly designates a standard or a conventional type of hand-operated press having a base portion 11, an uprising portion 12 and a horizontally disposed cantilever portion 13. The base portion 11 has a plate 14 suitably secured thereto for supporting a grease pan 15. The standard 10 may be mounted on any suitable surface such as a table or the like indicated by the line T.

A vertically disclosed brace bar 16 is suitably secured to the rearmost portion of the plate 14 and extends transversely thereof and serves as an abutment for the lower ends of U-shaped support members or guards broadly designated at 20. The members 20 are identical and, in the present illustration, two of the members 20 are utilized, it being understood that any desired number may be used. Each of the members 20 is provided with a horizontal web portion 21 and downwardly extending legs 22 and 23. The U-shaped members 20 are also provided with flanges 24 extending from the front legs 23 thereof. The height of the legs 22 and 23 of the U-shaped members 20 is sufficient to accommodate the grease pan 15 therebeneath. The ends of the legs 22 abut against the bar 16 and the members 20 are held in place as by thumb nuts 25 mounted on suitable bolts fixed to the base 14.

At each end of the base plate 14, there is provided a support and guard member 30 which has a front leg portion 31 secured to the plate 14, as by welding, and a horizontally disposed portion 32 which is disposed at an elevation slightly above the top or the web portions 21 of the members 20. The guard members 30 are each provided with a transversely extending projection 33 at the rear end thereof. The rear portion of each of the guards 30 is supported by a bar 34 suitably secured thereto and to the base plate 14, as by welding.

The structure thus defined is designed to accommodate a plurality of roll pans indicated at 35. For purposes of illustration, the entire apparatus is shown for use with three roll pans 35 secured together but it is to be understood that the apparatus could be utilized with only a single small roll pan or a large roll pan or any desired number of roll pans, merely by increasing or decreasing the size of the apparatus. It is preferred, however, that a unit of three roll pans 35 be utilized as these units are commonly used in commercial baking and are readily available. The bread pans 35 are secured together in a unit by means of a band 36 extending therearound and suitably secured thereto as by welding. They are also secured in slightly spaced relation to each other by means of braces 37 and 38 suitably secured to the pans 35 as by welding.

It will be observed that the height of the band 36 is less than the height of the roll pans 15; a distance which is equal to the distance between the top of the support members 20 and the top of the support members 30. The length of the roll pan unit formed from the three roll pans 35 is substantially the same as the distance between the guards 30 spaced transversely on the plate 14. It will thus be seen that the roll pan unit may be placed with the bottoms of some of the roll pans 35 resting upon the upper surfaces of the support members 20 and with the lower surfaces of the end portions of the band 36 resting upon and being supported by the two end guards 30. The projections 33 at the rear of the end guards 30 serve to confine the roll pan unit and to hold the same in the desired position; that is, to prevent movement of the roll pans too far rearwardly or towards the standard 10.

Now, in forming rolls with this apparatus, it is first necessary to mold dough into a plurality of individual portions or balls 40. This is conventionally done either manually or preferably with a machine which forms balls of dough of a predetermined size. A plurality of balls of dough are placed in each of the roll pans 35. The balls 40 are arranged in rows which extend longitudinally; that is, from front to rear of the apparatus, substantially as illustrated. It is preferred to have three rows of balls of dough in each pan 35, each row containing four balls of dough, thus providing a dozen balls in each pan 35. It is obvious that any desired number may be used, the only requirement being that the balls of dough 40 in each row are in alinement with each other.

Heretofore, balls of dough, such as the balls 40, have been formed and have been baked in this condition to form rolls of fairly even configuration of the biscuit type. In order to form rolls of the Parker House or crimp type, it has been necessary to flatten the balls 40 and fold the same partially upon themselves. By means of this apparatus, it is possible to crimp each of the balls of dough 40 so that, when the baking process is completed, rolls of Parker House or crimp type may be formed without the necessity of manually handling the balls of dough 40 to achieve the desired crimp or fold.

To this end, there is provided a vertically movable crimping or dividing means broadly designated at 50. The crimping or dividing means 50 comprises a plate 51 fixedly secured, as by welding, to the lower end of a vertically movable plunger in the form of a rack 52. The rack 52 is mounted for vertical sliding movement in a journal portion 53 of the cantilever portion 13 and meshes with a pinion 54 fixed on a shaft 55 rotatably mounted in the cantilever portion 13 of the standard 10. The shaft 55 extends outwardly a short distance on one side of the standard 10 and is secured against endwise movement, as by a collar 56. The shaft 55 extends outwardly a considerable distance on the other side of the standard 10 and is further secured against endwise movement as by a collar 37 adjacent the portion 13 of the standard 10.

The shaft 55 extends outwardly on one side of the standard 13 a sufficient distance to cause the outer end thereof to be disposed beyond the base 13. This outer end portion of the shaft 55 is penetrated by a suitable handle lever 58 retained therein as by collars 60. The lever handle 58 may be manually rotated to rotate the pinion 54 to thus cause the rack 52 to move vertically in the journal 53 of the cantilever extension 13 of the standard 10. By reason of the length of the shaft 55, it will be observed that the handle 58 has sufficient room for complete rotation without engaging or interfering with any of the other parts of the apparatus.

Brace rods 61 and 62 are preferably provided to assist in securing the plate 51 of the crimping means to the rack 52. These rods 61 have their lower ends secured to portions of the plate 51, as by welding, and converge upwardly and are suitably secured to the upper portion of the rack 52, above the cantilever portion or extension 13 of the standard 10. A plurality of crimping members or knife elements 65 are secured to the plate 51 and depend therefrom. These crimping members or knife elements 65 may be of any desired construction and may be secured to the plate 51, as by bolts, welding or in any other desired manner.

In the preferred construction, each of the knife elements 65 is made up of a pair of inverted L-shaped depending members 66 each having a horizontally disposed flange which is secured to the lower surface of the plate 51 by means of bolts 67. The L-shaped members for each knife element are spaced from each other, one at the front of the plate 51 and one at the rear. The lower edges of the L-shaped members 66 are tapered to a rounded point. The inverted L-shaped members 66 are secured in spaced relation to each other by means of a longitudinally extending pipe 71 suitably secured at each end thereof to the respective member 66, as by welding.

It will be observed that the pipe 71 is connected to the L-shaped members 66 approximately at the point at which the side walls begin to converge. Now, in forming the crimping members, it is preferred that sheet material be secured to the frame thus formed from the members 66 and the pipe 71 to form a side wall 72 and then the sheet material is bent around at 70 and then upwardly along the other sides of the member 66 to form a second side wall 73. The sheet material may be secured to the members 66 and to the pipe 71 in any desired manner, as by welding or soldering and thus assumes a wedge-shaped or V-shaped cross-sectional configuration on each of the crease-forming or knife elements 65.

It will thus be observed that the edge of each knife, formed at the point 70, is a relatively dull one which will cause the members 65 to crimp or crease the portions of dough 40 without severing these portions completely apart. Any desired number of crimping members 65 may be secured to the plate 51, it being understood that there should be one crimping member or knife element 65 for each longitudinal row of portions of dough 40 to be divided. In the present illustration, where three roll pans 35 are used, each having three rows of dough portions 40 therein, nine knife elements 65 are provided; three for each roll pan 35, corresponding to the three rows of dough portions therein.

The knife elements 65, in the present illustration, are secured to the plate 51 in spaced relation to each other and each of the knife elements 65 extends transversely or forwardly and rearwardly of the plate 51 and is so positioned as to be disposed directly above the center portion of each of the rows of portions of dough 40 disposed in the pan 35 therebeneath. Since the apparatus is designed for this particular use, it would normally not be necessary to change the position of the knife elements 65 once the machine is set up for a particular size roll pan. However, it is contemplated within this invention that, if desired, suitable slots could be formed in the plate 51 which would be penetrated by the bolts 67 to permit adjustment of the knife elements 65 for variations in the material to be crimped.

It is thus seen that, in operation, the guard members 20 are first removed, the pan 15 is filled with hot liquefied grease and is then placed in position as shown in the drawings. Thereafter, the guards 20 are again secured in position. The crimping element 50 is then lowered by means of the handle 58 and rack 52 so that the knife elements 65 depending therefrom are positioned within the hot grease, indicated at G, in the grease pan 15. This removes any piece of dough which may have previously adhered to the knives, and prevents dough from sticking to the knives when they are later forced into the balls of dough and then removed therefrom. It should be observed here that certain of the knife elements 65 are spaced further from each than others so as to leave an area between each group of three knife elements 65 corresponding to the distance between adjacent pans 35 and corresponding to the members 20 so that, when the crimping means 50 is lowered, the knife elements 65 will pass on either side of the members 20 and will be at least partially submerged in the grease G.

The operator then rotates the handle 58 to raise the crimping means 50, to substantially the position shown in Figures 1 and 2, at which time a roll pan unit consisting of the three roll pans 35, secured together in the manner described, is placed on the guards 20 and 30. The operator then rotates the handle 58 in the opposite direction, causing the crimping means 50 to be lowered so that the rounded or pointed lower edges 70 of the knife elements 65 engage the portions of dough 40 in each of the roll pans 35. The knife elements 65 will thus crimp or crease each of the roll portions 40 as will clearly be observed in Figures 5 and 7. The handle 58 is then rotated to move the crimping means upwardly after which the roll pans 35 may be removed and the material therein may be baked, since the portions 40 will have been crimped by the knife elements 65, thus forming rolls of the Parker House type.

It is thus seen that there is provided a crimping device for crimping portions of dough to form Parker House rolls, which eliminates the necessity of forming such rolls by hand as has heretofore been necessary in most instances.

In the drawings and specification, there has been set forth a preferred embodiment of the invention and although specific terms are employed, they are used in a generic and descriptive sense only and not for purposes of limitation, the scope of the invention being defined in the claims.

I claim:

1. Apparatus for creasing a plurality of relatively small portions of dough arranged in rows in a plurality of open-topped baking pans secured in fixed relation to each other by a surrounding frame, comprising a platform, a pair of end frame members disposed in spaced parallel relation to each other on said platform, at least one guard detachably secured to said platform and having its medial portion spaced from said platform and extending across and above the platform, said guard being spaced between said frame members, the upper surface of said guard being spaced below the upper faces of the end frame members, said guard serving to support the bottoms of the baking pans, and said end frame members serving to support the frame surrounding said pans and insuring proper positioning thereof, a vertically movable plate normally spaced above said guard, a plurality of elongated wedge-shaped crimping elements secured to said plate, and manually operable means for moving said plate and the crimping elements downwardly and then upwardly whereby the crimping elements may be lowered into close proximity to the platform and then moved upwardly to permit placement of the pans therebeneath, and upon subsequent downward movement of the crimping elements all of the portions of dough will be crimped simultaneously.

2. Apparatus for creasing a plurality of relatively small portions of dough arranged in rows in a plurality of open-topped baking pans secured in fixed relation to each other by a surrounding frame, comprising a platform, a pair of end frame members disposed in spaced parallel relation to each other on said platform, at least one guard detachably secured to said platform and having its medial portion spaced from said platform and extending across and above the platform, said guard being spaced between said frame members, the upper surface of said guard being spaced below the upper faces of the end frame members, said guard serving to support the bottoms of the baking pans, and said end frame members serving to support the frame surrounding said pans and insuring proper positioning thereof, a vertically movable plate normally spaced above said guard, a plurality of elongated wedge-shaped crimping elements secured to said plate, and manually operable means for moving said plate and the crimping elements downwardly and then upwardly whereby the crimping elements may be lowered into close proximity to the platform and then moved upwardly to permit placement of the pans therebeneath, and upon subsequent downward movement of the crimping elements all of the portions of dough will be crimped simultaneously, said guard being disposed between the paths of travel of two of the crimping elements and being narrower than the distance between the said two crimping elements to permit the crimping elements to pass by the guard.

References Cited in the file of this patent

UNITED STATES PATENTS

| Number | Name | Date |
| --- | --- | --- |
| 1,112,764 | Brodhead | Oct. 6, 1914 |
| 1,309,419 | Rafert | July 8, 1919 |
| 1,653,063 | Rill | Dec. 20, 1927 |
| 1,836,485 | Michaelis et al. | Dec. 15, 1931 |
| 1,966,732 | Perkins et al. | July 17, 1934 |

FOREIGN PATENTS

| Number | Country | Date |
| --- | --- | --- |
| 89,080 | Germany | Mar. 31, 1896 |